UNITED STATES PATENT OFFICE.

RAY GAMBLE AND EGBERT J. SLITER, OF TACOMA, WASHINGTON.

PREPARED FISH-EGGS.

1,392,253.     Specification of Letters Patent.    Patented Sept. 27, 1921.

No Drawing.     Application filed March 22, 1920. Serial No. 367,686.

*To all whom it may concern:*

Be it known that we, RAY GAMBLE and EGBERT J. SLITER, citizens of the United States, residing at Tacoma, in the county of Pierce and State of Washington, have invented certain new and useful Improvements in Prepared Fish-Eggs, of which the following is a specification.

This invention relates to improvements in salmon or other fish eggs for use as bait; and the method in preparing the same.

The object of our invention is the provision of a fish-egg for fish-bait that is desirable and pleasant to use, will not soil the fingers when handled, as in placing upon the hook, and which will not readily spoil through mold or mildew when the container is opened to the air, and which will remain in the container for an indefinite period in separate individual condition and can be rolled out of the can one or two at a time, like pellets.

The invention consists in the novel method of treating the fish-egg and in the new product arising therefrom.

Heretofore salmon eggs have been prepared for bait purposes by separating them from the membraneous egg-envelop into their individual state and then rendering their interior liquid contents more or less solid whereby they may be penetrated by a fish-hook without losing their body. Such prepared eggs are in general use and the method of preparing them is well known in the art, but they are somewhat sticky and tend to lump together in the can or container in which sold, and are difficult to remove and unpleasant and difficult to handle in the fingers in baiting the hook, and are offensive in smell owing to the oil exuding through their skin.

By our invention, the eggs are dusted or rolled in a non-absorbent powder that is insoluble by the juices of the egg, and remain in the container in a free and individual state somewhat like pills and can be rolled out one at a time or as used, and when handled will not soil or scent the fingers. When the eggs are baited upon the hook and thrown into the water, the powder is immediately washed off and the egg will resume its original color, no trace of the powder remaining thereon.

While the powder employed is non-absorbent, it will take up any moisture and together with the fact that the eggs are kept in separated condition, this will prevent the eggs becoming readily spoiled through mold after the can is opened, as eggs untreated by our method are apt to do.

In carrying out our invention we take the individual eggs after they are separated, and treated in the several methods now employed to partially solidify the liquid interiors thereof, and dust or roll them in a non-absorbent powder that is insoluble in water. We prefer to use lycopodium powder, but talcum, sulfur or other powder of similar nature may be utilized.

When the eggs are thoroughly coated, they may be placed in an air-tight container and are then ready for use or sale.

Having described our invention, what we claim and desired to secure by Letters-Patent, is—

1. A preserved fish egg having its contents partially solidified, coated with a powdered non-absorbent material adapted to quickly wash off in water.

2. A preserved fish egg having its contents partially solidified, coated with powdered lycopodium.

Seattle, Washington, March 9 1920.

RAY GAMBLE.
EGBERT J. SLITER.